United States Patent
Wenzel et al.

(10) Patent No.: US 12,423,535 B2
(45) Date of Patent: Sep. 23, 2025

(54) DETECTION DEVICE AND METHOD FOR DETECTING A COUPLING STATE OF A COUPLING DEVICE

(71) Applicant: Illinois Tool Works Inc., Glenview, IL (US)

(72) Inventors: Daniel Wenzel, Wipperfürth (DE); Ulrich Geschwentner, Schwarmstedt (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/528,372

(22) Filed: Dec. 4, 2023

(65) Prior Publication Data
US 2024/0185009 A1 Jun. 6, 2024

(30) Foreign Application Priority Data

Dec. 6, 2022 (DE) ..................... 10 2022 132 412.5
Nov. 28, 2023 (DE) ..................... 10 2023 133 265.1

(51) Int. Cl.
*G06K 7/08* (2006.01)
*G06K 7/10* (2006.01)

(52) U.S. Cl.
CPC ...... *G06K 7/10366* (2013.01); *F16L 2201/10* (2013.01)

(58) Field of Classification Search
CPC ......... G06K 7/10366; G06K 19/07749; G06K 19/07773; G06K 19/0716; G06K 19/07
USPC ....................................................... 235/451
See application file for complete search history.

(56) References Cited

U.S. PATENT DOCUMENTS

| | | |
|---|---|---|
| 7,494,156 B2 | 2/2009 | Okada |
| 7,497,477 B2 | 3/2009 | Pepe |
| 7,566,077 B2 | 7/2009 | Tsurumi |
| 7,845,684 B2 | 12/2010 | Gaudin |
| 8,240,716 B2 | 8/2012 | Kerin |
| 9,890,887 B2 | 2/2018 | Barthel |
| 10,107,433 B2 | 10/2018 | Eckard |
| 10,550,982 B2 | 2/2020 | Pepe |
| 10,738,926 B2 | 8/2020 | Stieler |
| 11,262,008 B2 | 3/2022 | Rydin |
| 11,365,840 B2 | 6/2022 | Gauthier |

(Continued)

FOREIGN PATENT DOCUMENTS

| | | | | |
|---|---|---|---|---|
| CN | 101636890 | * | 7/2012 | ....... G06K 19/07345 |
| WO | 2021183633 | * | 9/2021 | ............. F16L 33/10 |

*Primary Examiner* — Daniel St Cyr
(74) *Attorney, Agent, or Firm* — McAndrews, Held & Malloy, Ltd.

(57) ABSTRACT

According to the disclosure, a detection apparatus for detecting a coupling state of a connection apparatus having a first and a second element to be connected to one another is provided. It comprises a signal device, wherein the signal device is configured such that the signal device indicates a digital change of state by means of a detection signal, in that an existing signal is deactivated and thus in particular a switch from 1 to 0 (deactivation) occurs or a signal is activated or produced and thus in particular a change from 0 to 1 (activation) occurs when a complete coupling of a first and a second element of a connection apparatus is achieved, so that, due to an omission of the signal or the newly produced signal, the detection signal is produced which indicates whether a final assembly position is achieved.

16 Claims, 6 Drawing Sheets

(56) References Cited

U.S. PATENT DOCUMENTS

| | | |
|---|---|---|
| 11,598,463 B2 | 3/2023 | Gabbey |
| 2007/0285250 A1* | 12/2007 | Moskowitz ........ G06K 19/0739 340/10.1 |
| 2008/0100456 A1* | 5/2008 | Downie ............. G06K 19/0717 340/686.2 |
| 2021/0199222 A1 | 7/2021 | Choo |
| 2022/0026002 A1 | 1/2022 | Gocha |
| 2022/0299141 A1 | 9/2022 | Choo |

\* cited by examiner

DETECTION DEVICE AND METHOD FOR DETECTING A COUPLING STATE OF A COUPLING DEVICE

RELATED APPLICATIONS

The present application claims the benefit of German Patent Application No. 10 2022 132 412.5, filed Dec. 6, 2022, and German Patent Application No. 10 2023 133 265.1, filed Nov. 28, 2023, each titled "Detection Device and Method for Detecting a Coupling State of a Coupling Device," the contents of which are hereby incorporated by reference.

BACKGROUND

RFID (radio frequency identification) refers to a technology for transmitter-receiver systems for automatically and contactlessly identifying and locating objects and living beings with radio waves.

An RFID system consists of a transponder (also known as a radio tag), which can be used on or in the object or living being and contains a characterizing code, and a reader device for reading this identifier.

RFID transponders can produce stable circuitry from polymers via a special imprinting process. The advantages of this technique arise from the combination of the small size, the unobtrusive readout possibility, and the low price of the transponder (some in the cent range).

The coupling is done by magnetic alternating fields produced by the reader device in a short range or by high-frequency radio waves. This not only transmits data but also powers the transponder. Active, self-powered transponders are used in order to achieve greater ranges, but are associated with a higher cost.

The reader device contains a software (a microprogram) that controls the actual reading process and RFID middleware with interfaces to further computing systems.

The RFID transponders initially differ from one another depending on the transmission frequency, manufacturer, and intended use. In principle, the construction of an RFID transponder provides for an antenna, an analog circuit for receiving and transmitting (transceiver), and a digital circuit and a permanent memory. In more complex models, the digital circuit is a small microcontroller.

RFID transponders have a memory containing their immutable identity, which memory can be written at least once. If memories with multiple writing are used, further information can be stored during the service life. Depending on the region of application, the other identifiers differ, such as clock frequency, transmission rate, service life, cost per unit, storage space, reading range, and functional scope.

Despite various advancements to date, it would nevertheless be desirable to provide an improved a detection apparatus as well as to a method for detecting a coupling state of a connection apparatus.

SUMMARY

The present disclosure relates generally to a coupling and associated method, substantially as illustrated by and described in connection with at least one of the figures, as set forth more completely in the claims. More specifically, to a detection apparatus as well as to a method for detecting a coupling state of a connection apparatus.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent to or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The problem addressed by the present disclosure is to provide a detection apparatus for detecting a coupling state of a connection apparatus as well as a corresponding method for easily determining whether a first and a second element of a connection apparatus are fully connected to one another in a final assembly position.

A further problem addressed by the present disclosure is to provide a detection apparatus as well as a method for detecting a coupling state of a connection apparatus, which represent an alternative to methods known from the prior art.

A further problem addressed here is to form the detection apparatus as well as a method for detecting a coupling state of a connection apparatus that are simple to use and safe and reliable in operation.

According to the disclosure, a detection apparatus for detecting a coupling state of a connection apparatus having a first and a second element to be connected to one another is provided. It comprises a signal device, wherein the signal device is configured such that the signal device indicates a digital change of state by means of a detection signal, in that an existing signal is deactivated and thus in particular a switch from 1 to 0 (deactivation) occurs or a signal is activated or produced and thus in particular a change from 0 to 1 (activation) occurs when a complete coupling of a first and a second element of a connection apparatus is achieved, so that, due to an omission of the signal or the newly produced signal, the detection signal is produced which indicates whether a final assembly position is achieved.

With the present disclosure, a simply constructed detection apparatus is provided, which causes a digital change of state in order to produce a detection or confirmation signal. This can be either a 0 to 1 change (activation) or a 1 to 0 change (deactivation).

The detection apparatus according to the disclosure is also easily integrated into a variety of types of connection apparatuses, for example, for fluids, for liquids, for gases, for power, and/or for data.

In addition, the detection apparatus according to the disclosure represents an alternative to apparatuses known from the prior art and is simply constructed.

The simple configuration of the present disclosure allows for safe and reliable production of a detection signal in order to determine whether a final assembly position has been achieved.

The signal device can preferably be an RFID tag, which comprises an RFID chip, an antenna and, a connection portion with in particular two lead frames, wherein the RFID chip is or can be connected to the antenna via the conduction portion forming a detection portion, wherein the detection signal can be the deactivated signal that can be produced by an interruption of the conduction portion, or wherein the detection signal can be the activated signal that can be produced by establishing a connection via the conduction portion.

The present disclosure can thus provide for a deactivation or an activation of an RFID tag.

The RFID tag can be applied onto a carrier material, in particular by means of imprinting, wherein the carrier material is formed from a suitable adhesive carrier, such as paper or natural fibers.

The imprinting of a carrier material allows for a simple and cost-efficient formation of the detection apparatus according to the disclosure.

By providing an adhesive carrier, the detection apparatus can be applied onto an element of a connection apparatus in a simple manner by means of gluing.

By severing the conduction portion, a detection signal or a verification signal or a confirmation signal for detecting the final assembly position is formed and made available.

In particular, it is provided that the RFID chip is connected to the antenna in a pre-assembly position of the connection apparatus via the conduction portion, wherein the connection apparatus comprises means for severing the connection portion or means for providing a connection via the connection portion.

The connection portion can comprise a target breaking point or a separation point, which is preferably formed by a constricted region of the connection portion.

Furthermore, a connection apparatus for connecting a first and a second element is provided, having a detection apparatus as described above, wherein an RFID tag comprises an RFID chip, an antenna, and a conduction portion, wherein the RFID chip is or can be connected to the antenna via the conduction portion, wherein the connection apparatus comprises means for interrupting the connection portion or for establishing a connection between the RFID chip and the antenna, so that the detection apparatus indicates a digital change of state by means of a detection signal, in that an existing signal is deactivated and thus in particular a switch from 1 to 0 (deactivation) occurs or a signal is activated or produced and thus in particular a change from 0 to 1 (activation) occurs when a complete coupling of the first and the second element of a connection apparatus is achieved, so that, due to an omission of the signal or the newly produced signal, the detection signal is produced which indicates whether a final assembly position is achieved.

The connection apparatus can be a connection apparatus for connecting lines, for example, electrical lines or data lines or fluid lines, in particular liquid or gas lines or power lines.

Accordingly, the connection apparatus can comprise a first plug-like plug element and a second socket-like socket element, wherein a retaining element can also be provided for fixing an end-assembly position of the connection apparatus.

The detection apparatus can then be applied onto one of the three elements, wherein, upon achieving a final assembly position in which the two elements, i.e., the socket element and the plug element, are fully connected to one another, the connection portion is severed or a connection between the RFID chip and antenna is established via the connection portion.

The advantages of the connection apparatus according to the disclosure correspond analogously to the advantages described above with respect to the detection apparatus according to the disclosure.

The means for interrupting the connection portion can be a cutting part or a counter-contour for severing the connection portion.

Such means can be arranged on a retaining element, for example, wherein, in a final assembly position, the retaining element severs the connection portion of the RFID tag correspondingly arranged on the socket element or the plug element of the connection apparatus.

The RFID tag can thus be arranged on the first or the second element, wherein the connection portion comprises in particular a target breaking point for severing the connection portion, and wherein a cutting apparatus in the first or second element can be formed in particular in the region of the target breaking point of the connection portion.

By providing such a cutting apparatus, the severing of the connection portion by means of a corresponding cutting means is facilitated without damage to the corresponding component of the connection apparatus.

Furthermore, according to the present disclosure, a detection system for detecting a final assembly position of a connection apparatus as described above is provided. It comprises a control apparatus having a detection antenna, wherein a signal device of a detection apparatus of the connection apparatus detects a digital change of state by means of a detection signal, in that an existing signal is deactivated and thus in particular a switch from 1 to 0 (deactivation) occurs or a signal is activated or produced and thus in particular a change from 0 to 1 (activation) occurs when a complete coupling of a first and a second element of a connection apparatus is achieved, so that, due to the omission of the signal or a newly produced signal, a detection signal is produced, wherein the detection antenna receives or does not receive the detection signal which indicates whether a final assembly position of the connection apparatus is achieved.

The advantages of the detection system according to the disclosure correspond to the advantages described above on the basis of the detection apparatus according to the disclosure.

In addition, according to the present disclosure, a method for detecting a final assembly position of a connection apparatus having a detection system as described above is provided. The method comprises the following steps: connecting a first element and a second element of a connection apparatus, achieving a final assembly position of the connection apparatus in which the first element and the second element are fully connected to one another, and preferably retained by means of a retaining ring, in a final assembly position, and thereby producing a digital change of state in that an existing signal is deactivated and thus a switch from 1 to 0 (deactivation) occurs or a signal is activated or produced and thus a change from 0 to 1 (activation) occurs, so that, due to an omission of the signal or a newly produced signal, the detection signal is produced.

The advantages of the method according to the disclosure correspond to the advantages described above with respect to the detection apparatus.

Furthermore, the method can comprise the following steps: receiving the detection signal by means of a detection antenna, detecting the detection signal by means of a control device, and providing the information that a full coupling of the first and second elements is achieved.

Such a detection system or a corresponding method can easily be implemented into a production line, because only a detection antenna and an associated control device must be provided in order to detect a corresponding state of the signal device, in particular of an RFID tag.

According to the disclosure, a detection apparatus 1 for detecting a coupling or connection state of a connection apparatus or a coupling apparatus is provided.

The detection apparatus 1 comprises a signal device, wherein the signal device is configured such that the signal device indicates a digital change of state by means of a detection signal, in that an existing signal is deactivated and thus in particular a switch from 1 to 0 (deactivation) occurs or a signal is activated or produced and thus in particular a change from 0 to 1 (activation) occurs when a complete coupling of a first and a second element of a connection apparatus is achieved, so that, due to an omission of the signal or a newly produced signal, the detection signal is produced which indicates whether a final assembly position is achieved.

According to the present exemplary embodiment, the signal device is configured as an RFID tag 2 (FIGS. 1 to 16).

Figure 1:
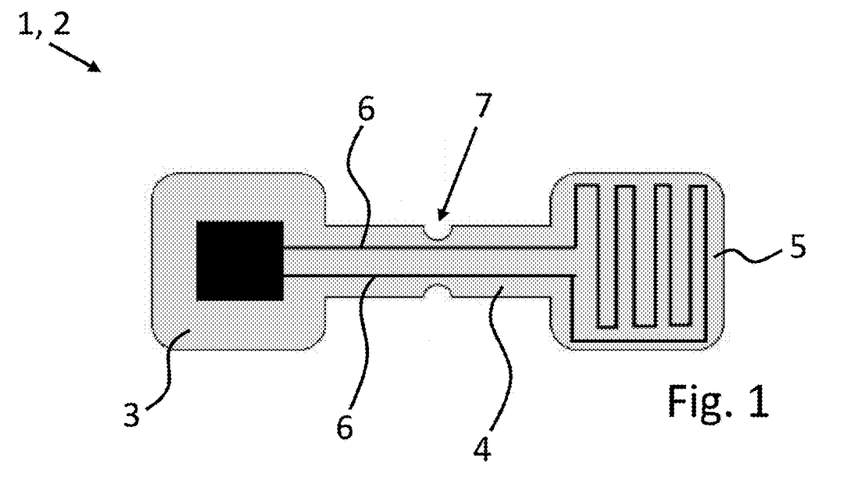
FIG. 1 illustrates a schematic illustration of a detection apparatus according to the disclosure.

The RFID tag 2 comprises an RFID chip 3, which is connected to an antenna 5 via a connection portion 4 forming a detection portion.

The connection portion 4 comprises two lead frames 6 and a target breaking point 7, which is configured in the form of a constriction point.

Furthermore, the RFID tag is applied onto a carrier material 8, in particular an adhesive carrier, preferably by means of imprinting.

The RFID chip 3 is connected to the antenna 5 via the conduction portion 4, wherein the detection signal in the present case is the deactivated signal, which is produced by an interruption of the conduction portion 4.

Furthermore, according to the present disclosure, a connection apparatus 9 for connecting a first and a second element is provided, having the detection apparatus 1 (FIGS. 2 to 16). The connection apparatus 9 can be configured as a fluid coupling apparatus, as described, for example, in the as yet unpublished German patent application bearing the application number 10 2023 133 217.1, which is herewith referred to in full with regard to the feasibility of plugs and sockets.

The connection apparatus 1 can comprise a socket element 10 with a retaining element 11 slidably arranged thereon as the first element and a plug element 14 as the second element.

Figure 2:
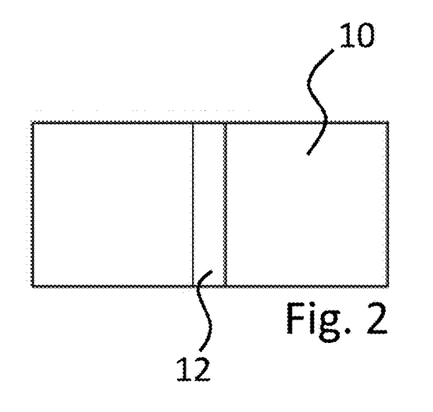
FIG. 2 illustrates a schematic partial illustration of an element of a connection apparatus to be connected, having a cutting groove in an aerial view.
Figure 3:
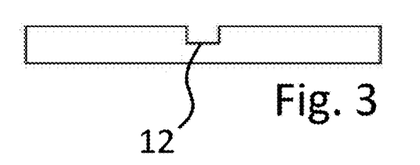
FIG. 3 illustrates the illustration from FIG. 2 in a side view.

A cutting groove 12 is formed on a sheath wall of the socket element 10.

Figure 4:
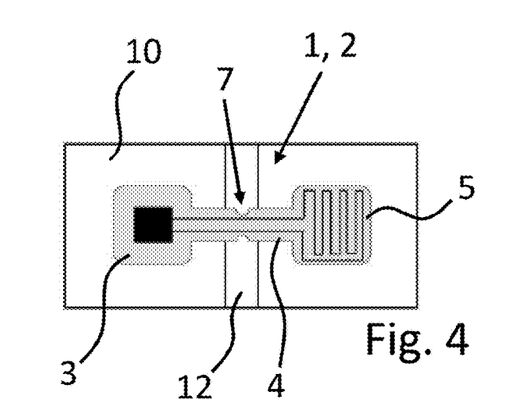
FIG. 4 illustrates the illustration from FIG. 2, wherein a connection portion of an RFID tag is arranged over the cutting groove.
Figure 5:
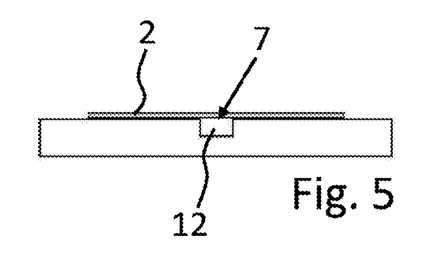
FIG. 5 illustrates the illustration from FIG. 4 in a side view.

Orthogonal to the cutting groove, the connection portion 4 of the RFID tag 2 is arranged, wherein the RFID tag is arranged on the socket element 10.

Figure 6:
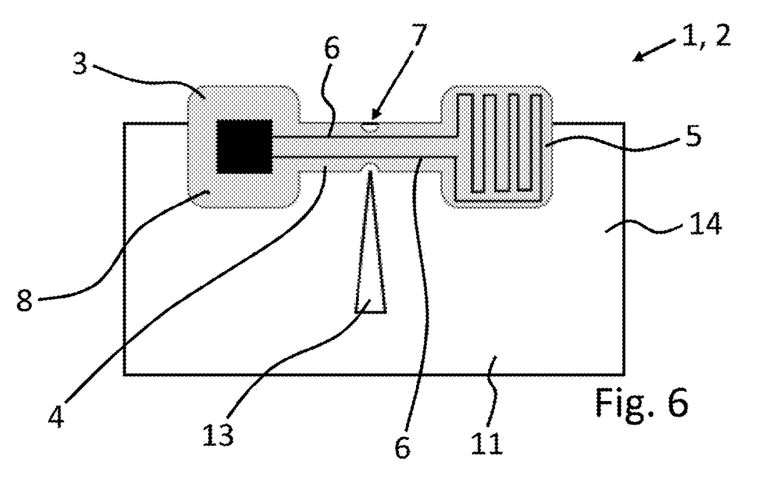
FIG. 6 illustrates a schematic partial illustration of an element of a connection apparatus to be connected, having a cutting means and a signal device.
Figure 7:
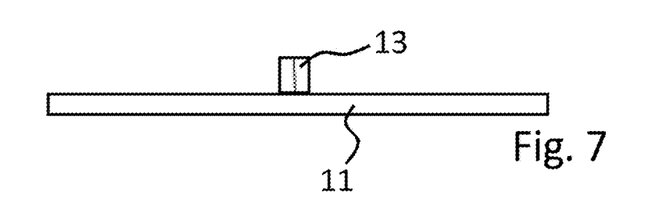
FIG. 7 illustrates a side view of the illustration from FIG. 6.

The retaining element 11 comprises a corresponding cutting means 13, wherein, upon achieving a final assembly position, the cutting means 13 of the retaining element 11 severs the connection portion 4 of the RFID tag and thus a signal transmission of the RFID chip is interrupted and, in this way, the detection signal is formed.

In the following, three further exemplary embodiments of the present disclosure will be described in further detail. Unless otherwise described, these exemplary embodiments have the same technical features as the detection apparatus 1 described above. Identical technical features bear the same reference numerals.

Figure 8:
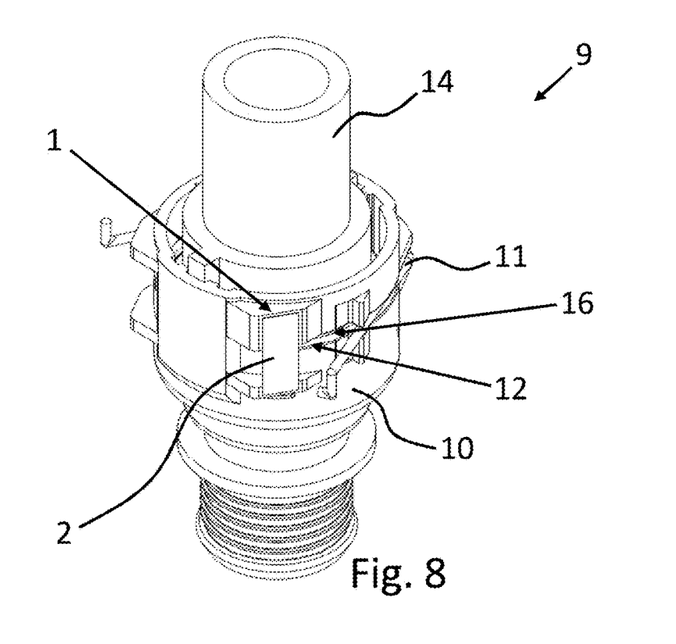
FIG. 8 illustrates a perspective illustration of a connection apparatus without a change of state according to a first exemplary embodiment.
Figure 9:
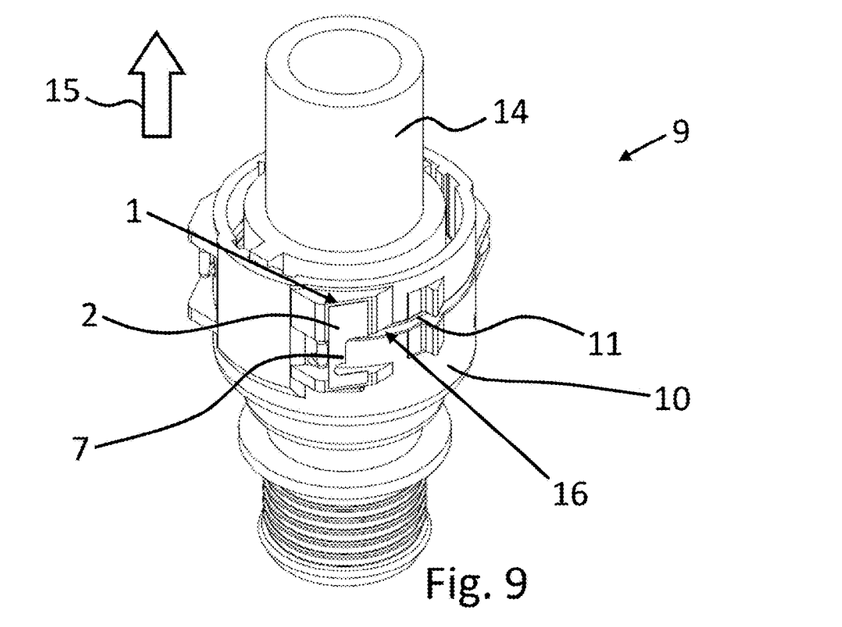
FIG. 9 illustrates the illustration from FIG. 8 with a change of state.

According to a first exemplary embodiment, the connection apparatus 9 is configured as a fluid coupling apparatus 5 (FIGS. 8 and 9).

The socket element 10 comprises a retaining element receiving slot 16 extending orthogonally to an axial direction 15. The detection means 1 is applied onto the retaining element receiving slot 16 such that the connection portion 4 and the target breaking point 7 are arranged in the region of the retaining element receiving slot 16. The retaining element receiving slot 16 forms the cutting groove 12 according to this exemplary embodiment.

To secure a final assembly position between the socket element 10 and the plug element 14, a clip-like retaining element 20 is provided. When the final assembly position is achieved, the retaining element 11 severs the connection portion 4 in the region of the target breaking point 7.

The retaining element 11 thus forms a counter-contour 17 or a cutting means 13.

According to a second exemplary embodiment (FIGS. 10 to 12), the connection apparatus 9 is configured similar to the first exemplary embodiment, however, according to this exemplary embodiment, it is provided that the detection apparatus 1 is arranged on a surface of a retaining ring 18 facing in the axial direction 15. In the region below the connection portion 4, the cutting groove 12 is configured in the retaining ring 18.

Figure 10:
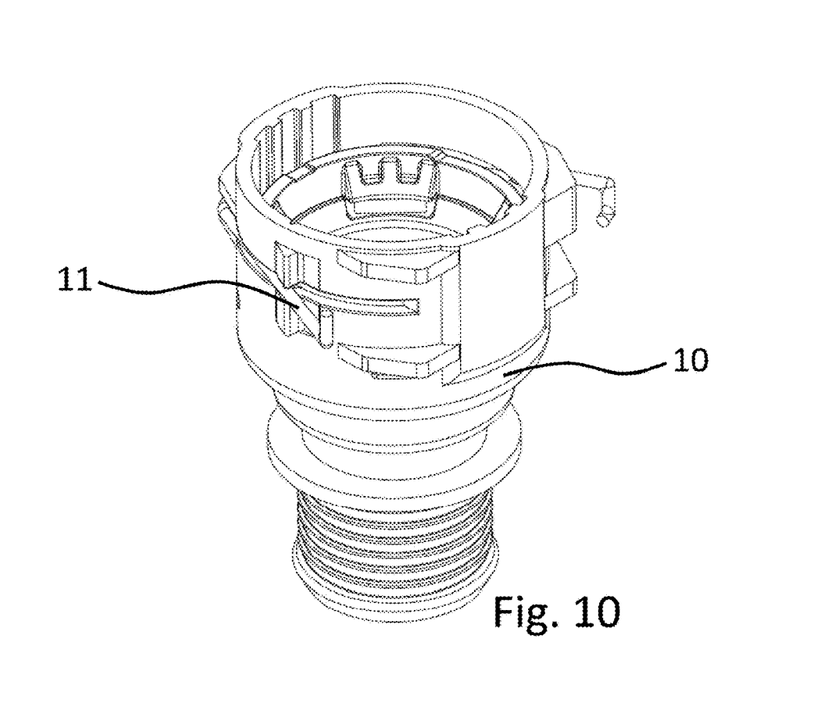
FIG. 10 illustrates a perspective view of a connection apparatus without a change of state according to a second exemplary embodiment.
Figure 11:
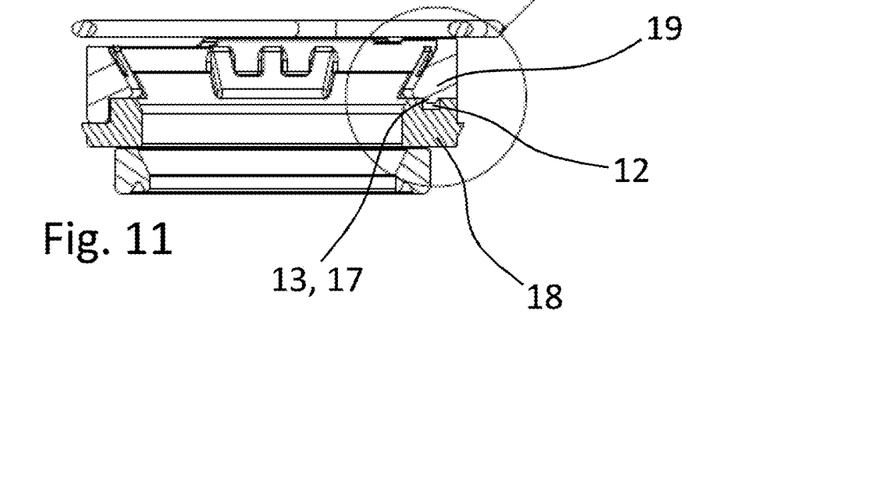
FIG. 11 illustrates the illustration from FIG. 10 with a change of state.
Figure 12:
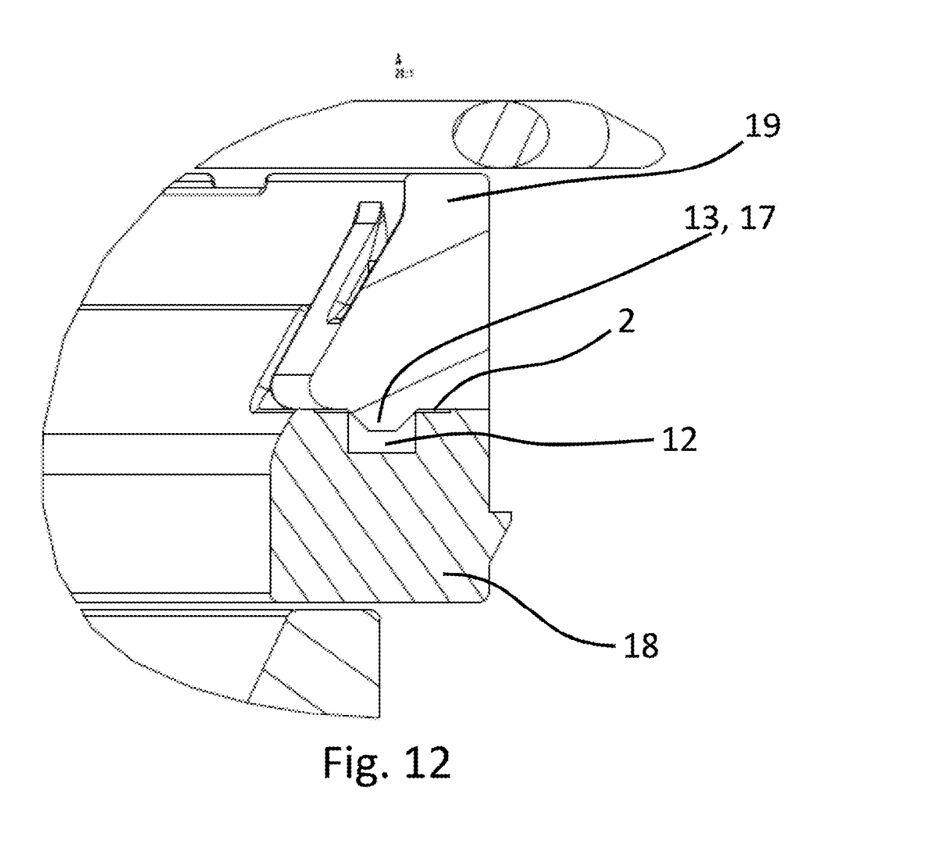
FIG. 12 illustrates a detail view of FIG. 11.
Figure 13:
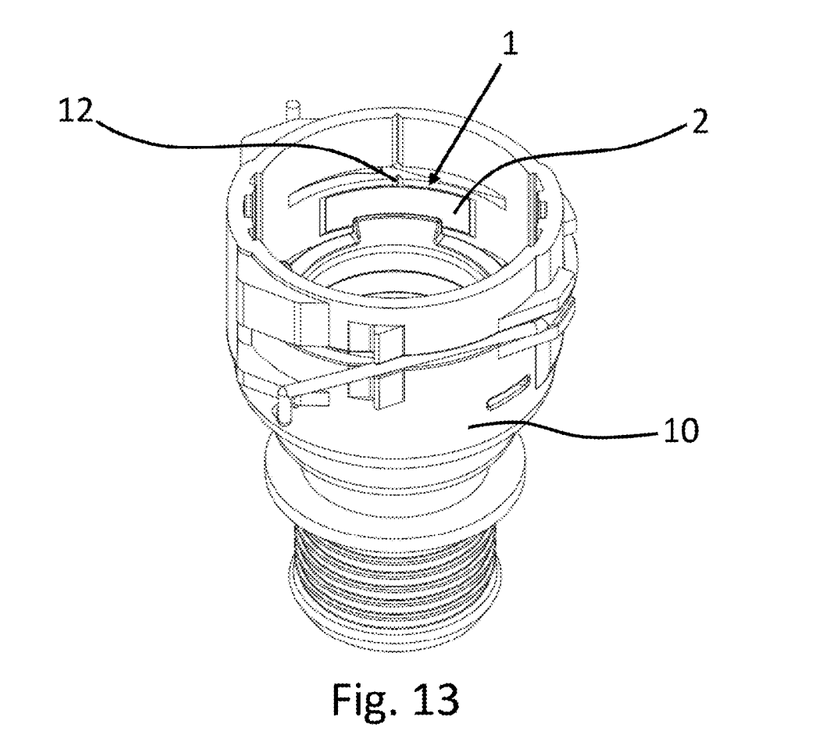
FIG. 13 illustrates a perspective illustration of a socket element of a connection apparatus without a change of state according to a third exemplary embodiment.
Figure 14:
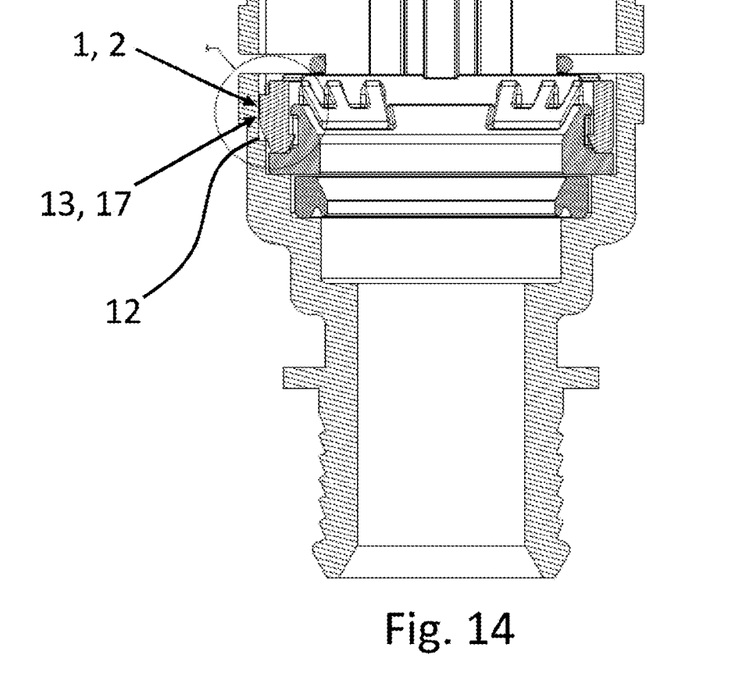
FIG. 14 illustrates a side-cut illustration of the connection apparatus according to the third exemplary embodiment with a change of state.
Figure 15:
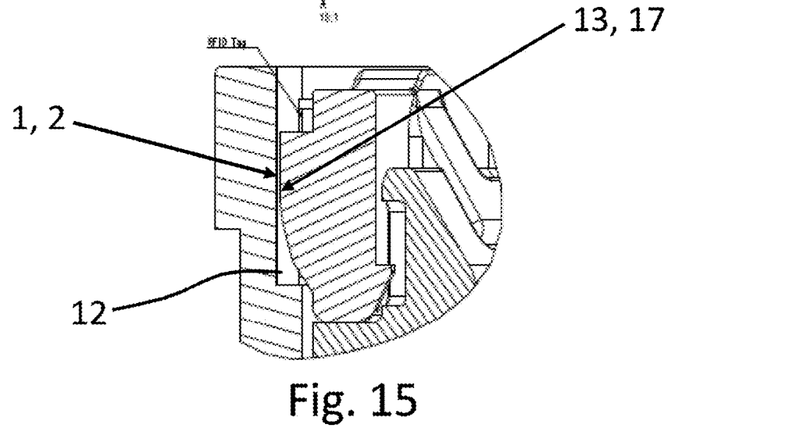
FIG. 15 illustrates a detail view from FIG. 14.
Figure 16:
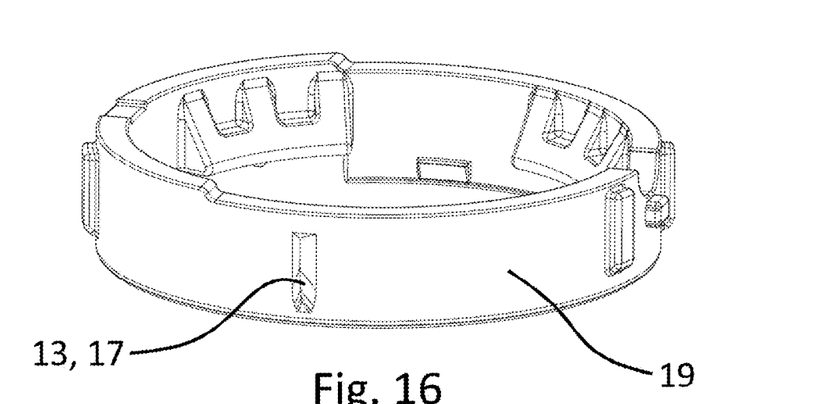
FIG. 16 illustrates a perspective illustration of a locking sleeve according to a third embodiment.

The counter-contour 17 is arranged on a surface of a locking sleeve 19 which also faces in the axial direction 15. Instead of the counter-contour 17, a cutting means 13 can also be provided here.

When the final assembly position is achieved, this counter-contour 17 severs the connection portion 4 in the region of the target breaking point 7, so that the final assembly position is detectable.

According to a third exemplary embodiment (FIGS. 13 to 16), the connection apparatus 9 is configured similar to the first two exemplary embodiments, however, according to this exemplary embodiment, it is provided that the detection apparatus 1 is arranged on an inner sheath wall of the socket element 10, such that the detection apparatus 1 faces inward in a radial direction. In the region below the connection portion 4, the cutting groove 12 extending in the axial direction 15 is arranged.

The counter-contour 17 is arranged on a radially outwardly facing surface of the locking sleeve 19. Instead of the counter-contour 17, a cutting means 13 can also be provided here.

When the final assembly position is achieved, this counter-contour 17 severs the connection portion 4 in the region of the target breaking point 7, so that the final assembly position is detectable.

Furthermore, according to the present disclosure, a detection system for detecting a final assembly position of a connection apparatus as described above is provided. It comprises a control apparatus having a detection antenna, wherein a signal device of a detection apparatus of the connection apparatus detects a digital change of state by means of a detection signal, in that an existing signal is deactivated and thus in particular a switch from 1 to 0 (deactivation) occurs or a signal is activated or produced and thus in particular a change from 0 to 1 (activation) occurs when a complete coupling of a first and a second element of a connection apparatus is achieved, so that, due to the omission of the signal or a newly produced signal, a detection signal is produced, wherein the detection antenna receives or does not receive the detection signal which indicates whether a final assembly position of the connection apparatus is achieved.

In addition, according to the present disclosure, a method for detecting a final assembly position of a connection apparatus having a detection system as described above is provided. The method comprises the following steps: connecting a first element and a second element of a connection apparatus, achieving a final assembly position of the connection apparatus in which the first element and the second element are fully connected to one another, and preferably retained by means of a retaining ring, in a final assembly position, and thereby producing a digital change of state in that an existing signal is deactivated and thus a switch from 1 to 0 (deactivation) occurs or a signal is activated or produced and thus a change from 0 to 1 (activation) occurs, so that, due to an omission of the signal or a newly produced signal, the detection signal is produced.

Furthermore, the method can comprise the following steps: receiving the detection signal by means of a detection antenna, detecting the detection signal by means of a control device, and providing the information that a full coupling of the first and second elements is achieved.

According to the disclosure, in order to produce a confirmation signal, it is provided that, when two elements of a connection apparatus have achieved a final assembly position and two lines are completely connected to one another, a digital change of state is used. This can be either a zero to one change (activation) or a one to zero change (deactivation).

The present disclosure describes the deactivation of an RFID tag on a suitable adhesive carrier (paper, natural fibers) by severing its antenna. The RFID tag is applied (e.g., printed) onto the carrier material.

The RFID tag consists of the RFID chip, the antenna, and a middle section between the RFID chip and antenna with a constricted region having two lead frames connecting the RFID chip to its antenna.

The constricted region is designed so as to create a target breaking point. This target breaking point is located directly over a cutting flute that is part of the QC body.

On the retaining element, a contour is arranged in the form of a sharp edge, which is aligned with the longitudinal axis of the cutting groove.

If the retaining clip is moved in order to lock the quick-lock, the antenna of the RFID tag is severed, thus causing a digital change of state from one to zero.

The RFID tag can no longer be read by the antenna of the production line.

The above-cited patents and patent publications are hereby incorporated by reference in their entirety. While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

LIST OF REFERENCE NUMERALS

1 Detection apparatus
2 RFID tag
3 RFID chip
4 Connection portion
5 Antenna
6 Lead frame
7 Target breaking point
8 Carrier material
9 Connection apparatus
10 Socket element
11 Retaining element
12 Cutting groove
13 Cutting means
14 Plug element
15 Axial direction
16 Retaining element receiving slot
17 Counter-contour
18 Retaining ring
19 Locking sleeve

What is claimed is:

1. A detection apparatus for detecting a coupling state of a connection apparatus having a first element with a retaining element and a second element with a retaining element receiving slot having a cutting groove, the first element and the second element configured to connect with one another such that the retaining element receiving slot receives the retaining element when the connection apparatus achieves a final assembly position, the detection apparatus comprising:
   a radio frequency identification (RFID) tag configured to provide a detection signal,
   indicating a current state of the connection apparatus and having an RFID chip, an antenna, and a connection portion that defines a target breaking point,
   wherein the RFID tag is configured to attach to the second component such that the connection portion traverses the retaining element receiving slot, and
   wherein the RFID tag is configured to indicate at that the final assembly position of the connection apparatus is achieved by deactivating the detection signal when the retaining element physically severs the connection portion adjacent the target breaking point of the RFID tag.

2. The detection apparatus according to claim 1,
   wherein the connection portion comprises two lead frames, that connect the RFID chip to the antenna, electrically, and
   wherein the detection signal is deactivated when one or more of the two lead frames is physically severed.

3. The detection apparatus according to claim 2,
   wherein the target breaking point is formed by a constricted region of the connection portion.

4. The detection apparatus according to claim 1,
   wherein the RFID tag is imprinted onto a carrier material, wherein the carrier material is formed from paper or natural fibers.

5. The detection apparatus according to claim 1, wherein the first element is a socket element and the second element is a plug element.

6. A detection system comprising:
   a connection apparatus having a first element with a retaining element and a second element with a retaining element receiving slot having a cutting groove,
   wherein the first element and the second element configured to connect with one another such that the retaining element receiving slot receives the retaining element when the connection apparatus achieves a final assembly position; and
   a radio frequency identification (RFID) tag configured to provide a detection signal indicating a current state of the coupling apparatus and having an RFID chip, an antenna, and a connection portion, that defines a target breaking point,
   wherein the RFID tag is attached to the second component such that the connection portion traverses the retaining element receiving slot, and
   wherein the RFID tag is configured to indicate that the final assembly position is achieved deactivating the detection signal when the retaining element physically severs the connection portion, adjacent the target breaking point of the RFID tag.

7. The detection system according to claim 6,
   wherein the retaining element comprises a contour or a cutting surface configured to sever the connection portion.

8. The detection system according to claim 6, further comprising:
   a control apparatus having a detection antenna, wherein the control apparatus is configured to determine whether the detection signal is signal present or the deactivated to determine whether the final assembly position of the connection apparatus is achieved.

9. The connection apparatus according to claim 6,
   wherein the connection portion comprises two lead frames that connect the RFID chip to the antenna electrically, and
   wherein the detection signal is deactivated when one or more of the two lead frames is physically severed.

10. The connection apparatus according to claim 6, wherein the target breaking point comprises a cutting furrow formed therein.

11. The connection apparatus according to claim 6, wherein the RFID tag is imprinted onto a carrier material.

12. The connection apparatus according to claim 11, wherein the carrier material is formed from paper or natural fibers.

13. The connection apparatus according to claim 6, wherein the first element is a socket element and the second element is a plug element.

14. A method for detecting a coupling state of a connection apparatus having a first element with a retaining element and a second element with a retaining element receiving slot with a cutting groove, the first element and the second element configured to connect with one another such that the retaining element receiving slot receives the retaining element when the connection apparatus achieves a final assembly position, the method comprising the following steps:
   connecting the first element and the second element of the connection apparatus,
   wherein the connection apparatus is coupled with a radio frequency identification (RFID) tag configured to provide a detection signal indicating a current state of the coupling apparatus and having an RFID chip, an antenna, and a connection portion, that defines a target breaking point, and
   wherein the RFID tag is attached to the second component such that the connection portion traverses the retaining element receiving slot;

achieving the final assembly position of the connection apparatus in which the first element and the second element are fully connected to one another in a final assembly position, wherein a severing feature formed in or on the retaining element is configured to physically sever at least a portion of the connection portion when the first element and the second element achieve the final assembly position; to deactivate the detection signal, and wherein the RFID tag is configured to indicate that the final assembly position is achieved by deactivating the detection signal when the retaining element physically severs the connection portion adjacent the target breaking point of the RFID tag.

15. The method according to claim 14, further comprising the following steps:

receiving the detection signal by means of a detection antenna;

detecting the detection signal by means of a control device; and providing information that the final assembly position is achieved.

16. The method according to claim 14, wherein the first element is a socket element and the second element is a plug element.

* * * * *